(12) United States Patent
Srungaram

(10) Patent No.: US 7,680,270 B2
(45) Date of Patent: Mar. 16, 2010

(54) SYSTEM FOR ELLIPTIC CURVE ENCRYPTION USING MULTIPLE POINTS ON AN ELLIPTIC CURVE DERIVED FROM SCALAR MULTIPLICATION

(75) Inventor: Gopala Krishna Murthy Srungaram, Kanchanbagh (IN)

(73) Assignee: The Additional Director (IPR), Defence Research & Development Organisation, New Delhi (IN)

( * ) Notice: Subject to any disclaimer, the term of this patent is extended or adjusted under 35 U.S.C. 154(b) by 1087 days.

(21) Appl. No.: 10/532,696

(22) PCT Filed: Oct. 20, 2003

(86) PCT No.: PCT/IN03/00339

§ 371 (c)(1),
(2), (4) Date: Nov. 23, 2005

(87) PCT Pub. No.: WO2004/038680

PCT Pub. Date: May 6, 2004

(65) Prior Publication Data

US 2006/0165231 A1    Jul. 27, 2006

(51) Int. Cl.
*H04L 9/30*    (2006.01)
*H04L 9/28*    (2006.01)
*H04K 1/02*    (2006.01)
*H04L 9/00*    (2006.01)
*H04K 1/00*    (2006.01)

(52) U.S. Cl. .......................................... 380/30; 380/28
(58) Field of Classification Search ........................ None
See application file for complete search history.

(56) References Cited

U.S. PATENT DOCUMENTS 5,146,500 A * 9/1992 Maurer ......................... 380/30

6,563,928 B1 * 5/2003 Vanstone et al. .............. 380/30

(Continued)

FOREIGN PATENT DOCUMENTS

EP     0 503 119 B1    9/1995
WO    WO 94/15423 A1    7/1994

OTHER PUBLICATIONS

Gallant, R. P., Lambert, R. J., and Vanstone, S. A. 2001. Faster Point Multiplication on Elliptic Curves with Efficient Endomorphisms. In Proceedings of the 21st Annual international Cryptology Conference on Advances in Cryptology (Aug. 19-23, 2001). J. Kilian, Ed. Lecture Notes in Computer Science, vol. 2139. Springer-Verlag, London, 190-200.*

(Continued)

*Primary Examiner*—Matthew T Henning
(74) *Attorney, Agent, or Firm*—The Webb Law Firm

(57) ABSTRACT

A method of elliptic curve encryption includes, (a) selecting an elliptic curve $E_p$ (a,b) of the form $y^2=x^3+ax+b$ mod (p) wherein a and b are non-negative integers less than p satisfying the formula $4a^3+27b^2$ mod (p) not equal to 0; (b) generating a large 160 bit random number by a method of concatenation of a number of smaller random numbers; (c) generating a well hidden point G (x,y) on the elliptic curve $E_p$ (a,b) by scalar multiplication of a point B (x,y) on the elliptic curve with a large random integer which further includes the steps: (i) converting the large random integer into a series of powers of $2^{31}$; (ii) converting each coefficient of $2^{31}$ obtained from above step into a binary series; (iii) multiplication of binary series obtained from steps (i) and (ii) above with the point B (x,y) on the elliptic curve; (d) generating a private key $n_A$ (of about $>=160$ bit length); (e) generating a public key $P_A$ (x,y) given by the formula $P_A$ (x,y)$=(n_A-G$ (x,y)) mod (p); (f) encrypting the input message MSG; (g) decrypting the ciphered text.

8 Claims, 7 Drawing Sheets

U.S. PATENT DOCUMENTS

| | | | |
|---|---|---|---|
| 7,092,522 B1* | 8/2006 | Futa | 380/28 |
| 2003/0026419 A1* | 2/2003 | Akishita | 380/30 |
| 2004/0158597 A1* | 8/2004 | Ye et al. | 708/492 |

OTHER PUBLICATIONS

SEC 1: Elliptic Curve Cryptography, Sep. 20, 2000, Certicom Corp. 98 Pages.*

SEC 2: Recommended Elliptic Curve Domain Parameters, Sep. 20, 2000, Certicom Corp., 51 Pages.*

Speeding the Pollard and Elliptic Curve Methods of Factorization, Peter L. Montgomery, Mathematics of Computation, vol. 48, No. 177 (Jan. 1987), pp. 243-264.*

Koblitz, Neal et al., "The State of Elliptic Curve Cryptography," Designs, Codes and Cryptography, 2000, pp. 173-193, vol. 19, Kluwer Academic Publishers, Boston.

* cited by examiner

SYSTEM FOR ELLIPTIC CURVE ENCRYPTION USING MULTIPLE POINTS ON AN ELLIPTIC CURVE DERIVED FROM SCALAR MULTIPLICATION

FIELD OF INVENTION

This invention relates to a method of elliptic curve encryption.

PRIOR ART

Data security, authentication and verification are desirable features in the Internet based data communications, wireless communication, E-Commerce and smart card related applications etc. Basically, data encryption systems can be divided into two categories: symmetric encryption systems and asymmetric encryption systems. In a symmetric encryption system, the same key is used to encrypt the data at sender's end and to decrypt the ciphered text at the receiver's end. However, in such systems, the encryption key is required to be exchanged beforehand over a secure communication channel.

Asymmetric encryption systems utilize two separate keys for encryption of the data and decryption of the ciphered text. The key to encrypt the data is made public while the corresponding decryption key is kept private and not shared with other. The private key can not be generated from the public key and, as such, only the intended recipient with the private key can decrypt the ciphered text. Asymmetric encryption systems do not need the prior exchange of keys and hence are preferred over symmetric encryption systems. The most well known asymmetric encryption system is RSA encryption system. The RSA encryption system is based on integer factorization problem.

In RSA algorithm, two primes p and q, usually very large, are required to generate a modulus n, with the equation n=p.q. In RSA algorithm the public key d and private key e are related with the equation $e.d = 1 \pmod{\theta}$ (sign stands for multiplication)

Where, $\theta = (p-1)(q-1)$

The input message M is encrypted with the equation $M_c = (M)^d \mod (n)$

Where $M_c$ is cipher of the input message M, d is the public key and n is the modulus. $M_c$ can be reconstructed to the input message M with the equation $M = (M_c)^9 \mod (n)$ In RSA algorithm, the private and public keys are chosen sufficiently big to achieve an adequate level of security. The security of the system is based on the principle of difficulty in factoring a large number that has no relatively small factors. Accordingly, p and q must be relatively large prime numbers. As the advances already made in crypt analysis system and computation speed are threats to the encryption systems utilizing moderate sized keys, bigger and bigger sized keys are being used for encryption systems. Ultimately, the size of the key (n) is required to be around 1024 bits to achieve an adequate level of security. Due to the need of bigger key size and nature of operation, RSA algorithm demands more memory, bandwidth for communication and computation lime.

However, the RSA technique, already known in the art, suffers from the following disadvantages.

Main disadvantage of the RSA encryption system, known in the art, is that it requires significant band width and storage capacity.

Another disadvantage of the RSA encryption technique, known in the art, is that it requires more time for computation and communication Yet another disadvantage of the RSA encryption system, known in the art, is that it is vulnerable particularly in view of the recent advances in the analytical techniques.

An alternate encryption system, Digital Signature Algorithm (DSA) is based on discrete logarithm problem on finite group. This encryption system is widely used for digital signature for authentication.

If G is a finite group and a and b are elements of G, then the equation $a^x = b$ represents a discrete logarithm problem. If a and x are known, finding b is straight forward. Here the value x is called logarithm of b to the base a, i.e. $x = \log_a b$. Finding the value of x is more difficult, if a and b are sufficiently large.

A variation of discrete logarithm problem is the elliptic curve discrete logarithm problem. In this case, the discrete logarithm is based on an elliptic curve $E_p(a,b)$, defined on a finite field. It is well known that solving a problem based an elliptic curve discrete logarithm is more difficult than a problem based on discrete logarithm based on finite group. In the elliptic curve cryptography method, each person can define his own elliptic curve for encryption and decryption, thus providing increased security. An elliptic curve can be easily redefined and new public and private keys can be generated to return to a secure system. The elliptic curve method reduces the bandwidth requirement of the public key system because the parameters can be stored with fewer keys. This is an important feature, which helps in restricting the key size in elliptic curve cryptography. The elliptic curve method of encryption is well known in the art. However, the elliptic curve methods, known in the art, suffer from following disadvantages.

Main disadvantage of the elliptic curve method of encryption, known in the art, is that the scalar multiplication invoked in the encryption process takes large computer time thereby rendering the entire encryption slower and unsuitable for applications where time factor is very critical.

Another disadvantage of the elliptic curve method, known in the art, is that the encryption process utilises only one coordinate of a point on the elliptic curve for encoding the message thereby reducing the throughput of the encryption system.

OBJECTS OF THE INVENTION

Primary object of the invention is to provide a method of elliptic curve encryption, which is based on discrete logarithm problem on elliptic curve.

Another object of the invention is to provide a method of elliptic curve encryption, which has a higher throughput as long streams of messages can be encrypted with same set of points.

Yet another object of the invention is to provide a method of elliptic curve encryption, which uses an efficient method of multiplication of a point on the elliptic curve $E_p(a, b)$ by a large integer thereby reducing the encryption time.

Still another object of the invention is to provide a method of elliptic curve encryption, which has higher security level as it selects different random points lying on the curve for different points of the message.

Yet further object of the invention is to provide a method of elliptic curve encryption, which utilises both x and y coordinates of points on the curve corresponding to a point in the plane generated from message thereby enhancing the throughput.

Still another object of the invention is to provide a method of elliptic curve encryption, which provides a separate method of generating random numbers thereby facilitating the realization of higher level of security.

Yet further object of the invention is to provide an improved elliptic curve encryption system, which provides an efficient binary series representation of big integer thereby optimising the scalar multiplication time by reducing number of operations.

SUMMARY OF THE INVENTION

According to the present invention, there is provided a method of elliptic curve encryption based on elliptic curve method. The Inherent security provided by the elliptic curve is derived from the characteristic that the addition of two points on the curve can be defined as another point on the curve. If a starting point is selected on the curve and is multiplied by an integer, the new point also lies on the elliptic curve. The present elliptic curve encryption method has lower bandwidth requirement and has reduced encryption time. The encryption method has enhanced security as it selects different random points lying on the curve corresponding to different points of the input message. The method provides an efficient method for selection of random points on the elliptic curve. The encryption method of the present invention utilizes x and y coordinates, both, corresponding to the message thereby increasing the throughput of the system. The present Invention also provides an efficient method to convert a big integer into a series of powers of 2, which reduces division and multiplication operations. It also provides an efficient method of scalar multiplication of a point on the elliptic curve by a large integer thereby reducing the encryption time.

DESCRIPTION OF THE INVENTION

Figure 1:
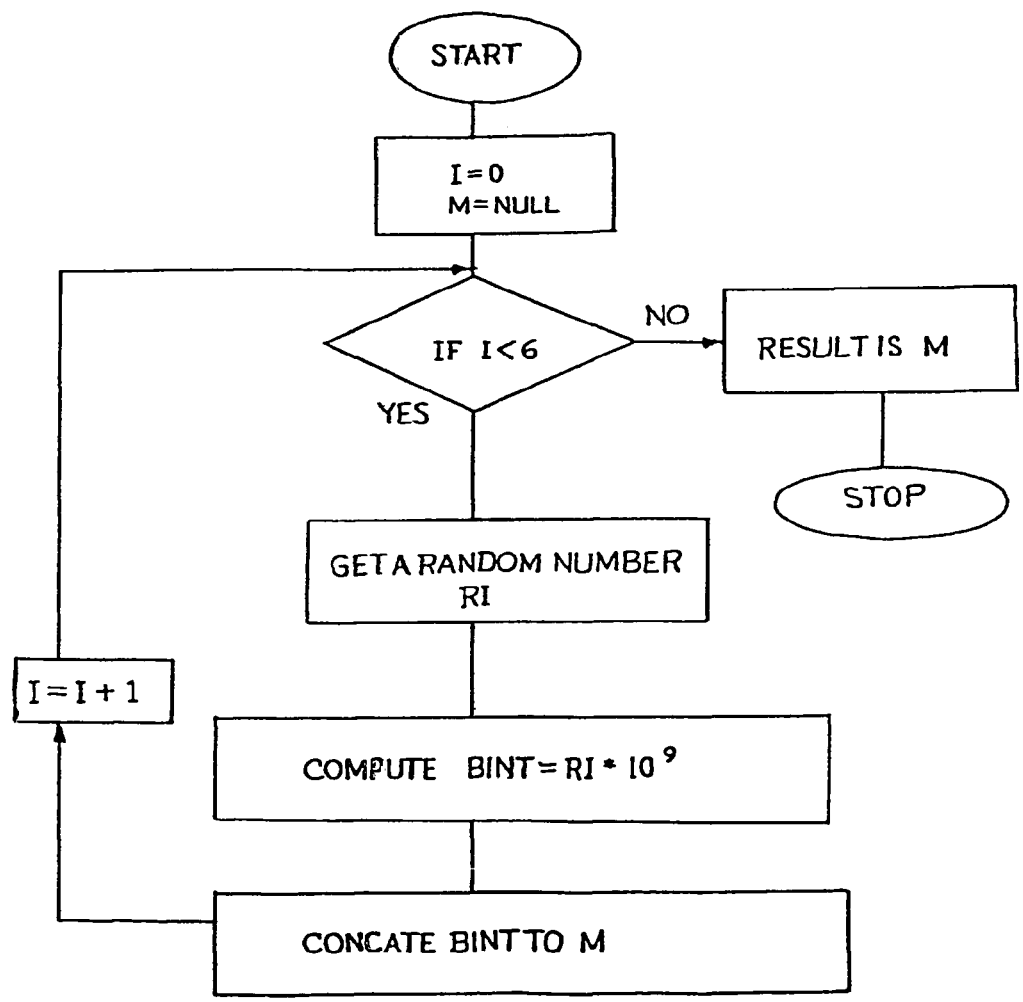
FIG. 1 is a list of steps involved in the generation of large random integer

Any encryption system based on elliptic curve cryptography derives its strength from elliptic curve discrete logarithm problem. An elliptic curve $E_p(a,b)$ over a finite field has, in general, the following form $$Y^2 = x^3 + ax + b \bmod (p)$$

Where, p is a large prime number and a, b are non-negative integers less than p that satisfy the following equation.

$$4a^3 + 27b^2 \bmod(p) \text{ not equal to } 0$$

In this algorithm, we have taken p as a 160-bit length (approximately 49 decimal digits) prime number. In this equation, selection of a, b & p decides the elliptic curve.

The purpose of secrecy is served, if a well hidden point G(x,y) on the elliptic curve is selected. This condition can be satisfied if coordinates x and y are large enough to be unpredictable. Finding such a well-hidden point on the elliptic curve is a challenging task. To solve this problem, the present method of encryption utilises the well-known property of the elliptic curve, that a scalar multiplication of a point on the elliptic curve gives another point on the elliptic curve. In the present method of encryption, initially a point on the curve is selected by scanning a limited range of x and then this value is multiplied by a large random integer to realize the required well hidden point on the elliptic curve.

In the present method of encryption, a large (160 bit) random integer $r_1$ is used to choose a point G(x,y) on the elliptic curve $E_p(a,b)$, where x and y coordinate values are also large. The random number $r_1$ is generated by a method of concatenation of a number of smaller random numbers. Once the point G(x,y) is known, the private key $n_A$ (approx 160 bits length) can be selected manually or by any predefined method. For the purpose of automation, a random integer $n_A$ has been considered as a private key. Then public key $P_A(x,y)$ is given by the formula $$P_A(x,y) = n_A \cdot G(x,y) \bmod(p)$$

Where stands for multiplication of point G (x,y) on an elliptic curve with a random integer $n_A$. Here $P_A(x,y)$ is also a point on the elliptic curve $E_p(a,b)$. Here both co-ordinates x and y are large and as such it is very difficult to predict or calculate $n_A$, even if the equation of the curve and public key information are made available. The improved elliptic curve encryption system, of the present invention, can be described in following steps with the help of corresponding figures.

(I) Generation an Elliptic Curve

An equation of elliptic curve $E_p(a,b)$ is generated by selecting two integers a & b which satisfy the following equation.

$$Y^2 = x^3 + ax + b \bmod (p)$$

Where, $4 a^3 + 27b^2 \bmod (p)$ not equal to 0

The elliptic curve equation is generated, while generating encryption keys, as described in step (IV)

(II) Generating a Large Random Integer

It is extremely important to generate a random point G(x,y) on the elliptic curve which has a very large value for its coordinates (of the order of 160 bit) to ensure secure encryption. In order to realize this, it is essential to generate large random integers. Selecting number of small random integers (less than 10 digits) and concatenating these random integers generates the large random integer. Large random numbers are also used elsewhere in the algorithm for the purpose of key generation and masking.

Referring to FIG. 1, the generation of a large random integer (say M) comprises of following steps:
(i) setting I=0
(ii) setting M to null
(iii) determining whether I<6
(iv) going to next if true
(v) returning M as result if false
(vi) generating a random number RI within (0,1) by using library function
(vii) multiplying RI with $10^9$ to obtain BINT-an integer of size 9 digits
(viii) concatenating BINT to M
(ix) setting I=I+1
(x) returning to step(iii)

The above procedure generate a big random integer M with the size of approximately 160 bits (49 decimal digits approximately 160 bits).

(III) Generating a Well Hidden Point on the Elliptic Curve by Scalar Multiplication of a Large Random Integer with a Point on Elliptic Curve Scalar multiplication of a point B (x,y) on the elliptic curve with a large random integer (say $r_1$) generates a well hidden point G (x,y) on the elliptic curve due to a well known property of the elliptic curve. A random point B (x,y) on the elliptic curve $E_p(a,b)$ is arbitrarily obtained by scanning a limited range of values [1,900] for x on the elliptic curve.

In the present invention, a new algorithm for performing scalar multiplication has been proposed. The process of scalar multiplication of the present invention optimises the computational time for performing the scalar multiplication. The scalar multiplication process is required for generation of well hidden point on the elliptic curve as well for generation of encryption keys, generation of ciphered text and deciphering of ciphered text. Scalar multiplication of a point on the elliptic curve with any large integer can be performed by repeated addition of the point on the elliptic curve. This optimised multiplication procedure requires binary series for addition of points which. In turn, demands representation of a large integer in powers of 2. This is achieved in following three steps.

(a) Conversion of the Large Random Integer Into a Binary Series

The random integer (M) is converted into a binary series of following type $M = m_0(2^{31})^0 + m_1(2^{31})^1 + \ldots m_n(2^{31})^n$ Where each $m_n(<2^{31}) = c_0 2^0 + c_1 2^1 + \ldots + c_{30} 2^{30}$ And $c_0, c_1 \ldots c_{30}$ are zero or one Now, the scalar multiplication of 2 with B(x,y) can also be considered as addition of B(x,y) and B(x,y).

Figure 2:
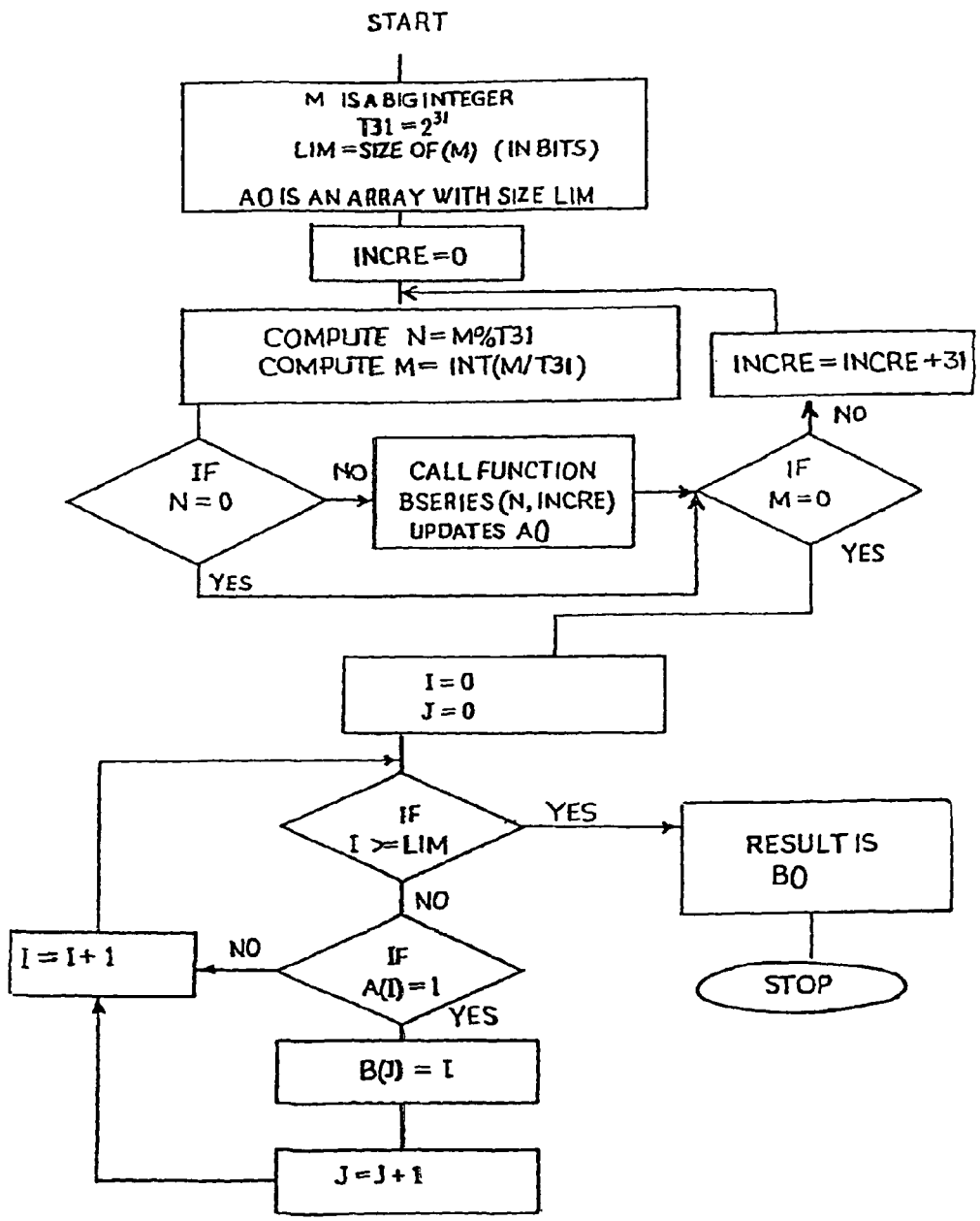
FIG. 2 is a list of steps to convert a large integer into a series of numbers which are multiples of $(2^{31})^n$, where each number is less than $2^{31}$.
Figure 3:
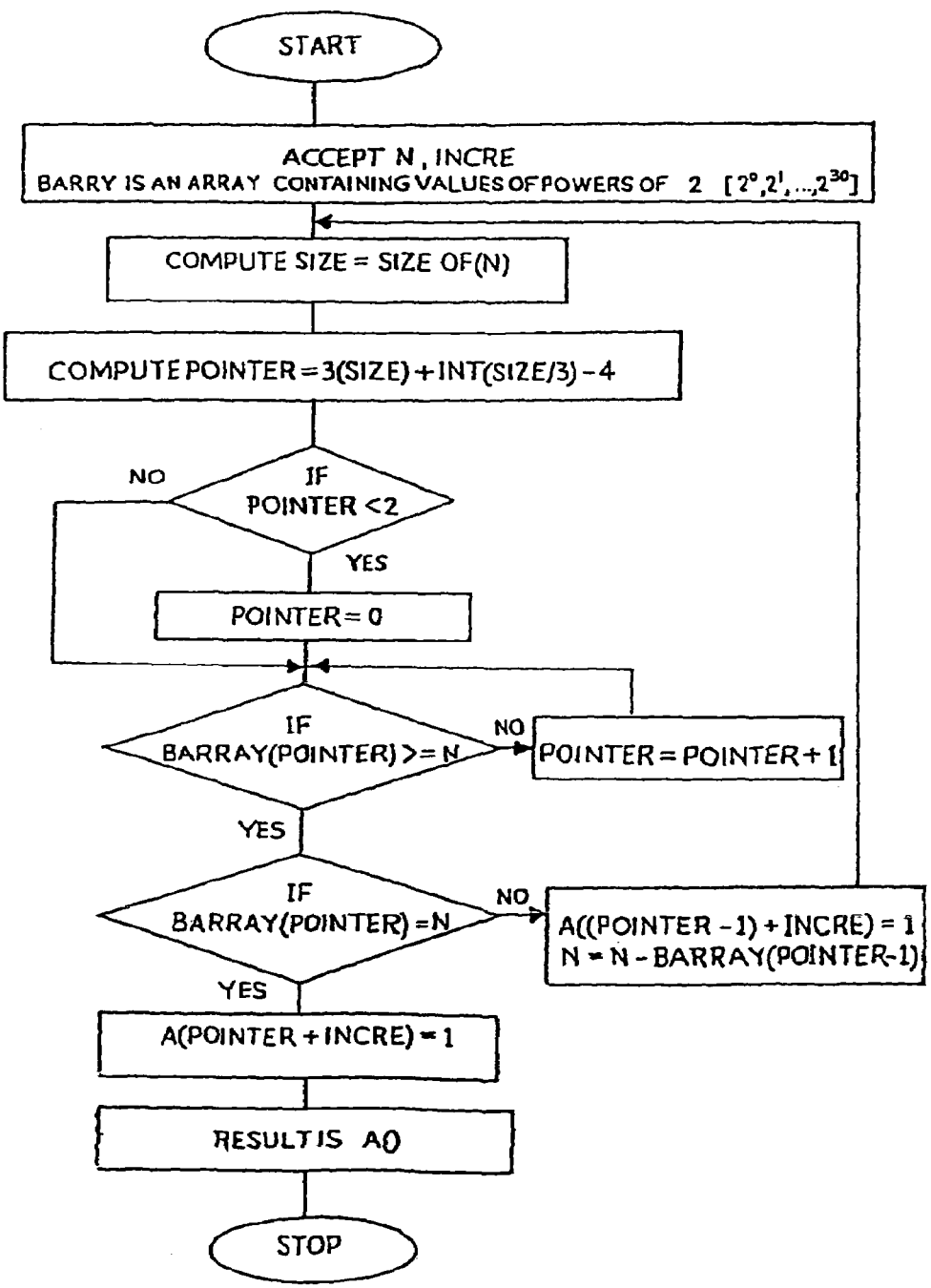
FIG. 3 is a list of steps to convert each of the coefficient of the series of numbers, which are multiples of $(2^{31})^n$, into a binary series.
Figure 4:
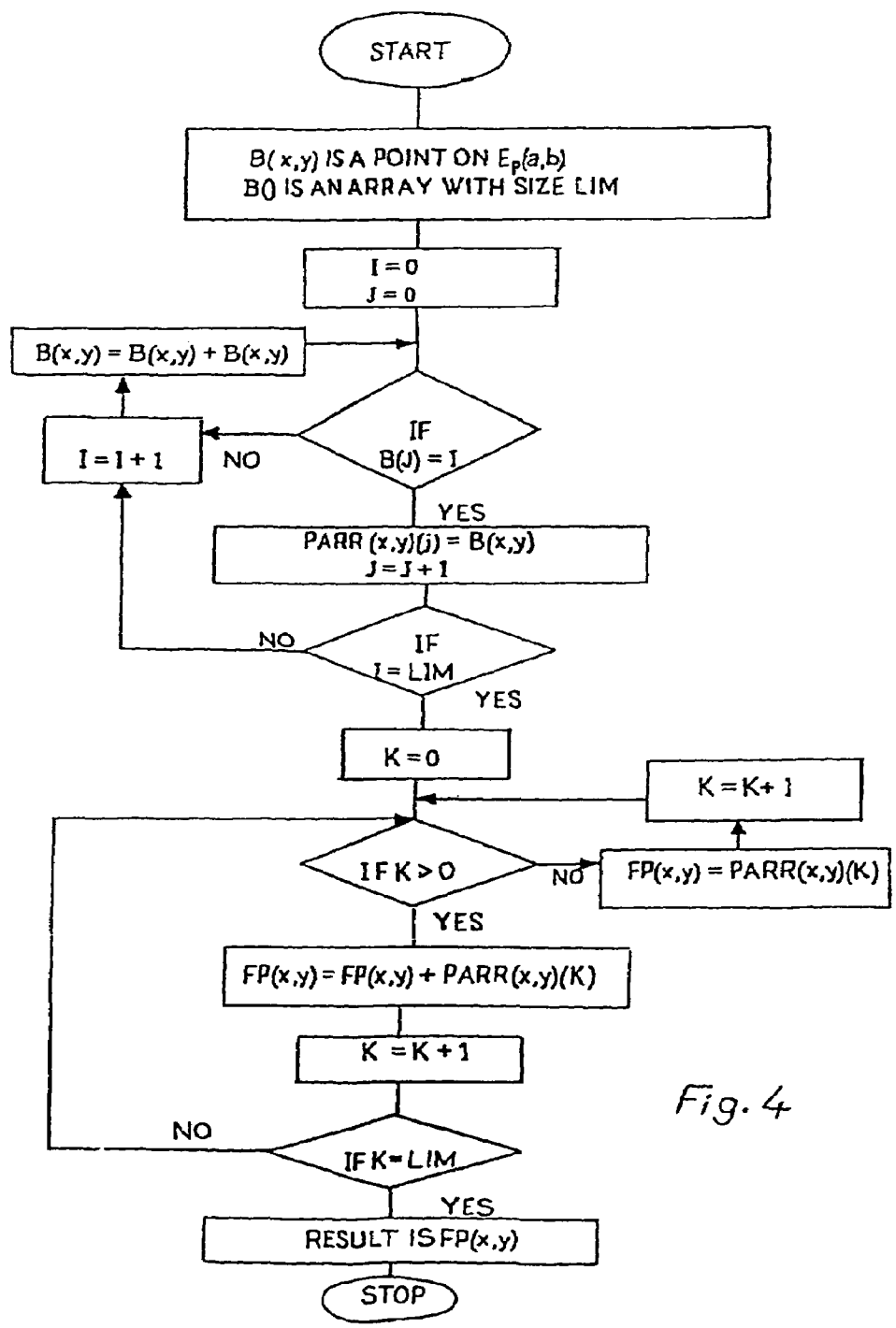
FIG. 4 is a list of steps involved in multiplication of a binary series with a point on the elliptic curve.

$2 \cdot B(x,y) = B(x,y) + B(x,y)$ and similarly, $2^2 \cdot B(x,y) = 2^1 \cdot B(x,y) + 2^1 \cdot B(x,y)\}$ and so on $2^n \cdot B(x,y) = 2^{(n-1)} \cdot B(x,y) + 2^{(n-1)} \cdot B(x,y)\}$ and so on (b) Addition of Two Points on the Elliptic Curve This addition is achieved by using the following formula $B_3(x,y) = B_1(x,y) + B_2(x,y)$ where X coordinate of $B_3(x,y) = s^2 - B_1(x) - B_2(x) \bmod (p)$ And Y coordinate of $B_3(x,y) = s(B_1(x) - B_3(x)) - B_1(y) \bmod (p)$ Where, $s = (B_2(y) - B_1(y))/(B_2(x) - B_1(x))$
{if $B_1(x,y) = B_2(x,y)$
$s = (3B_1^2(x) + a)/2B_1 y)\}$ Referring to FIG. 2, FIG. 3 & FIG. 4, the scalar multiplication of a random integer with a point on the elliptic curve comprises of following steps:

(a) Converting Big Integer Into a Series of Powers of $2^{31}$

In the first step, the big integer M is divided with a value of $2^{31}$ to obtain a series of values $m_0, m_1, m_2 \ldots m_n$ where the value of $m_n$ lies in $[0, 2^{31})$ so that $M = m_0(2^{31})^0 + m_1(2^{31})^1 + \ldots m_n(2^{31})^n$ Referring to FIG. 2 & FIG. 3 this comprises of following steps (i) accepting a big integer M
(ii) setting T31 equal to $2^{31}$
(iii) setting LIM=size of M (in bits) and initialize array A( ) with size LIM
(iv) setting INCRE equal to zero
(v) setting N equal to M modulus T31
(vi) setting M=INT (M/T31)
(vii) determining whether N is equal to 0
(viii) going to next if true
(ix) going to stop (xxiv) if false
(x) determining whether M is equal to 0
(xi) going to next if true
(xii) going to stop (xxvi) if false
(xiii) setting I & J equal to 0
(xiv) determining whether I≧LIM
(xv) going to next if false
(xvi) going to step (xxviii) if true
(xvii) determining whether A (I) is equal to 1
(xviii) going to next if true
(xix) returning to step (xxii) if false
(xx) setting B (J) equal to I
(xxi) setting J=J+1
(xxii) setting I=I+1
(xxiii) returning to stop (xiv)
(xxiv) calling function BSERIES (N, INCRE), which updates array A( )
(xxv) returning to step (x)
(xxvi) setting INCRE=INCRE+31
(xxvii) returning to stop (v)
(xxviii) returning array B ( ) as result (b) Converting Each Coefficient $m_n$ of the $2^{31}$ Series Obtained From Above Step Further Into a Binary Series In this step, coefficients of the individual numbers in the $2^{31}$ series, obtained from above step, are converted into a series of powers of 2. A function BSERIES is used to convert each coefficient ($m_n$) into a series of powers of 2.

Referring to FIG. 2 and FIG. 3, this comprises of following steps:

(i) accepting N and INCRE from step (a)
(ii) assigning BARRAY as an array of values which are powers of 2 ($[2^0, \ldots 2^{30}]$)
(iii) setting SIZE=size of N (in digits)
(iv) computing POINTER=3 (SIZE)+INT (SIZE/3)−4
(v) determining whether POINTER<2
(vi) going to next if true
(vii) going to step (ix) if false
(viii) setting POINTER equal to zero
(ix) determining whether (BARRAY(POINTER)≧N)
(x) going to next if true
(xi) going to step (xx) if false
(xii) determining whether BARRAY (POINTER)=N
(xiii) going to next if true
(xiv) going to step (xvii) if false
(xv) setting A (POINTER+INCRE) equal to 1
(xvi) returning array A ( ) as result
(xvii) setting A ((POINTER−1)+INCRE) equal to 1
(xviii) computing N=N−BARRAY (POINTER−1)
(xix) returning to step (III)

(xx) setting POINTER=POINTER+1
(xxi) returning to step (ix)

(c) Multiplication of Binary Series Obtained From Steps (a) and (b) Above with a Point on the Elliptic Curve.

Referring to FIG. 2 & FIG. 4, the multiplication of binary series with a point on the elliptic curve comprises of following steps:
(i) accepting B(x,y), a point on $E_p(a,b)$
(ii) accepting array B( ) with size LIM
(iii) setting I & J equal to zero
(iv) determining whether B(J)=I
(v) going to next if true
(vi) going to step (xxv) if false
(vii) setting PARR (x,y) (J) equal to B(x,y)
(viii) setting J=J+1
(ix) determining whether J is equal to LIM
(x) going to next if true
(xi) going to step (xxv) if false
(xii) setting K equal to zero
(xiii) determining whether K>0
(xiv) going to next if true
(xv) going to step (xxii) if false
(xvi) computing FP(x,y)=FP(x,y)+PARR(x,y) (K)
(xvii) setting K=K+1
(xviii) determining whether K=LIM
(xix) going to next if true
(xx) returning to step (xiii) if false
(xxi) returning FP(x,y) as result
(xxii) setting FP(x,y) equal to PARR(x,y) (k)
(xxiii) setting K=K+1
(xxiv) returning to step (xiii)
(xxv) setting I=I+1
(xxvi) setting B(x,y)=B(x,y)+B(x,y)
(xxvii) returning to step (iv)

(IV) Generating Encryption Keys

In order to create a public key, based upon the property of elliptic curve, discrete logarithm problem has to be established. For this, an arbitrary point on the elliptic curve, B(x,y) is selected. Next, a random integer $r_1$ is generated by adopting the procedure, as described in step (II). Scalar multiplication of this point on the elliptic curve with the random integer is performed to generate a well hidden point G(x,y) on the elliptic curve $E_p(a,b)$.

$$G(x,y)=r_1 \cdot B(x,y) \bmod (p)$$

The operation of scalar multiplication of random integer with the point on the elliptic curve is performed by adopting the procedure as described in step (III). Once the well hidden point G(x,y) is known, the private key $n_A$ (approximate 160 bit length) can be selected manually or by any predefined method. For the purpose of automation, a random number, $n_A$ is considered as private key. The public key $P_A$ (x,y) is given by the formula.

$$P_A(x,y)=n_A \cdot G(x,y) \bmod(p)$$

Once, the public key and the corresponding private key are determined the input message can be encrypted and decrypted with these keys.

Figure 5:
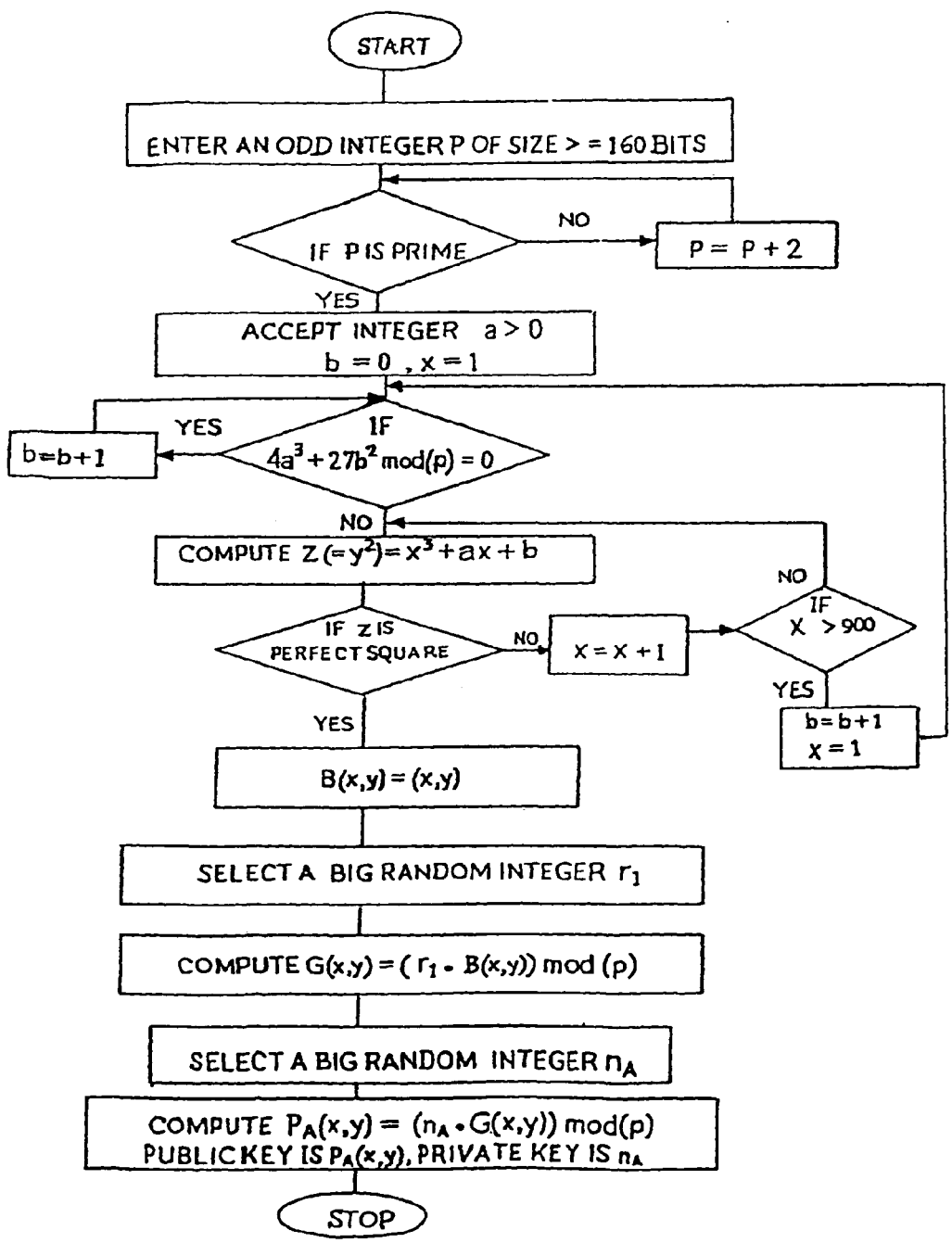
FIG. 5 is a list of steps involved in the generation of encryption keys

Referring to FIG. 5, the steps involved in generation of encryption keys are provided in the following.
(i) entering a big odd integer p of size≧160 bits
(ii) determining whether p is a prime number
(iii) going to next if p is prime
(iv) going to step (xix) if p is not prime
(v) entering a small integer a>0
(vi) setting integer b=0 & x=1
(vii) determining whether $4a^3+27b^2 \bmod(p)$ is equal to zero
(viii) going to next if false
(ix) setting b=b+1 if true and going to step(vii)
(x) setting z (=$y^2$) equal to $x^3+ax+b$
(xi) determining whether z is a perfect square
(xii) going to step(xxi) if z is not a perfect square
(xiii) setting B(x,y)=(x,y) if z is a perfect square
(xiv) selecting a large random integer $r_1$
(xv) setting G(x,y) equal to ($r_1 \cdot B(x,y)$) mod(p)
(xvi) selecting a large random integer $n_A$
(xvii) setting $P_A(x,y)$ equal to ($n_A \cdot G(x,y)$) mod(p)
(xviii) return $P_A(x,y)$ as public key and $n_A$ as private key
(xix) setting p=p+2
(xx) returning to step (ii)
(xxi) setting x=x+1
(xxii) determining whether x>900
(xxiii) going to next if true
(xxiv) returning to step (x) if false
(xxv) setting b=b+1
(xxvi) setting x=1
(xxvii) returning to step (vii)

(V) Encrypting the Input Message

Since the message (say MSG) is in an alphanumeric form, it is necessary to convert this message in a collection of numbers. Taking corresponding ASCII value of each character of the input message creates these numbers. These numbers are linearised by adding 1000 to each of the ASCII value. Out of these bunch of numbers corresponding to ASCII equivalent, only 48 digits are selected at a time. Now, out of these sets of 48 digits, adjacent two numbers $P_c(x,y)$ are selected as a set of points. However, these points may not lie on the elliptic curve. It is essential that all the points, which are to be encrypted, must lie on the elliptic curve. In order to realize this, following procedure is adopted.

Points $P_{mask}(x,y)$ and $P_k(x,y)$ on the elliptic curve are generated by using the following formula $$P_{mask}(x,y)=(K \cdot P_A(x,y)) \bmod(p)$$

$$P_K(x,y)=(K \cdot G(x,y)) \bmod (p)$$

Where K is a large random integer generated by following the procedure as described in step (II) above. Here $P_A(x,y)$ is the public key generated above and G (x,y) is the well hidden point generated above. Similarly, another point $P_m$ (x,y) on the elliptic curve is generated with the help of following formula.

$$P_m(x,y)=(r_2 \cdot G(x,y)) \bmod(p)$$

Here $r_2$ is another random integer generated by using the procedure as described in step (II) above.

This point $P_m$ (x,y) is masked with the help of the point $P_{mask}(x,y)$ on the elliptic curve generated above.

$$P_{mk}(x,y)=(P_m(x,y)+P_{mask}(x,y)) \bmod (p)$$

The encrypted message $P_B(x,y)$ is generated from the following $$P_B(x,y)=P_c(x,y)-P_m(x,y)$$

(Here – stands for difference of

Coordinates x and y of $P_c(x,y)$ and $P_m(x,y)$)

This process is repeated by selecting different random numbers for different set of (48,48) digits corresponding to the input message. This particular feature of the present encryption system enhances it's security level. It is clear, from above, that from $P_B(x,y)$ and $n_A$ the original message can not be reconstructed. In order to decrypt the ciphered message, it is essential to transmit $P_B(x,y)$, $P_{mk}(x,y)$ and $P_k(x,y)$. However, since $P_{mk}(x,y)$ and $P_k(x,y)$ are points on the elliptic curve $E_p(a,b)$, only x coordinate of these points need to be transmitted. Y coordinates of these points can be computed at other end by using elliptic curve $E_p(a, b)$. $P_e(x,y)$ is the message hidden with the help of a third point $P_m(x,y)$ on the elliptic curve $E_p(a,b)$.

Figure 6:
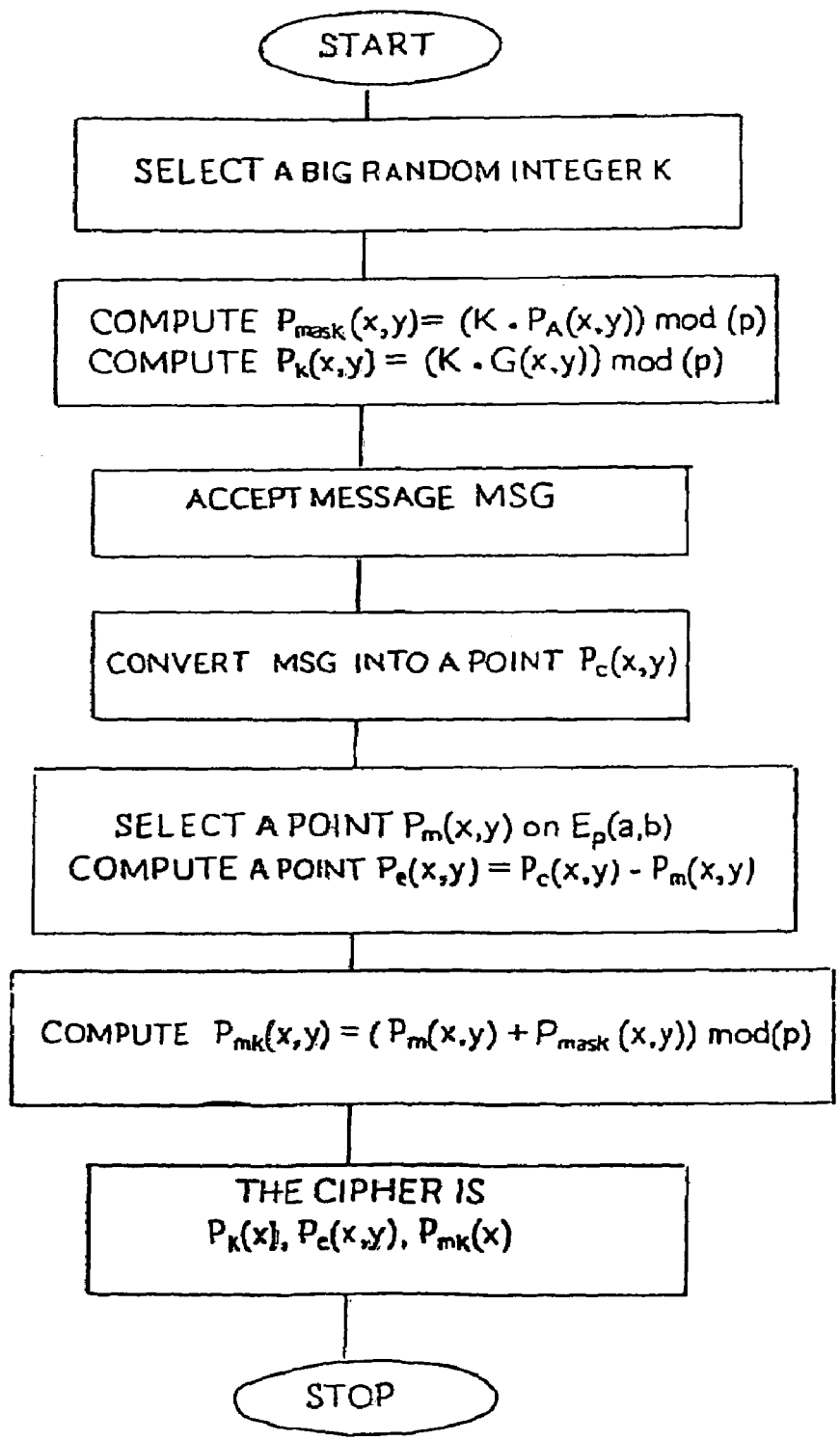
FIG. 6 is a list of steps involved in the encryption of input message

Referring to FIG. 6, the encryption process comprises of following steps:
(i) generating a large random integer K
(ii) setting $P_{mask}(x,y)=k\cdot P_A(x,y)$ mod (p)
(iii) setting $P_k(x,y)=k\cdot G(x,y)$ mod (p)
(iv) accepting the message (to be encrypted)
(v) converting the message into a point $P_c(x,y)$
(vi) generating a random point $P_m(x,y)$ on elliptic curve $E_p(a, b)$
(vii) setting $P_B(x,y)=(P_c(x,y)-P_m(x,y))$ (here-stands for difference of coordinates)
(viii) setting $P_{mk}(x,y)=(P_m(x,y)+P_{mask}(x,y))$ mod(p)
(ix) returning $P_k(x)$, $P_a(x,y)$ and $P_{mk}(X)$ as the result (cipher)

(VI) Decrypting the Encrypted Message

Figure 7:
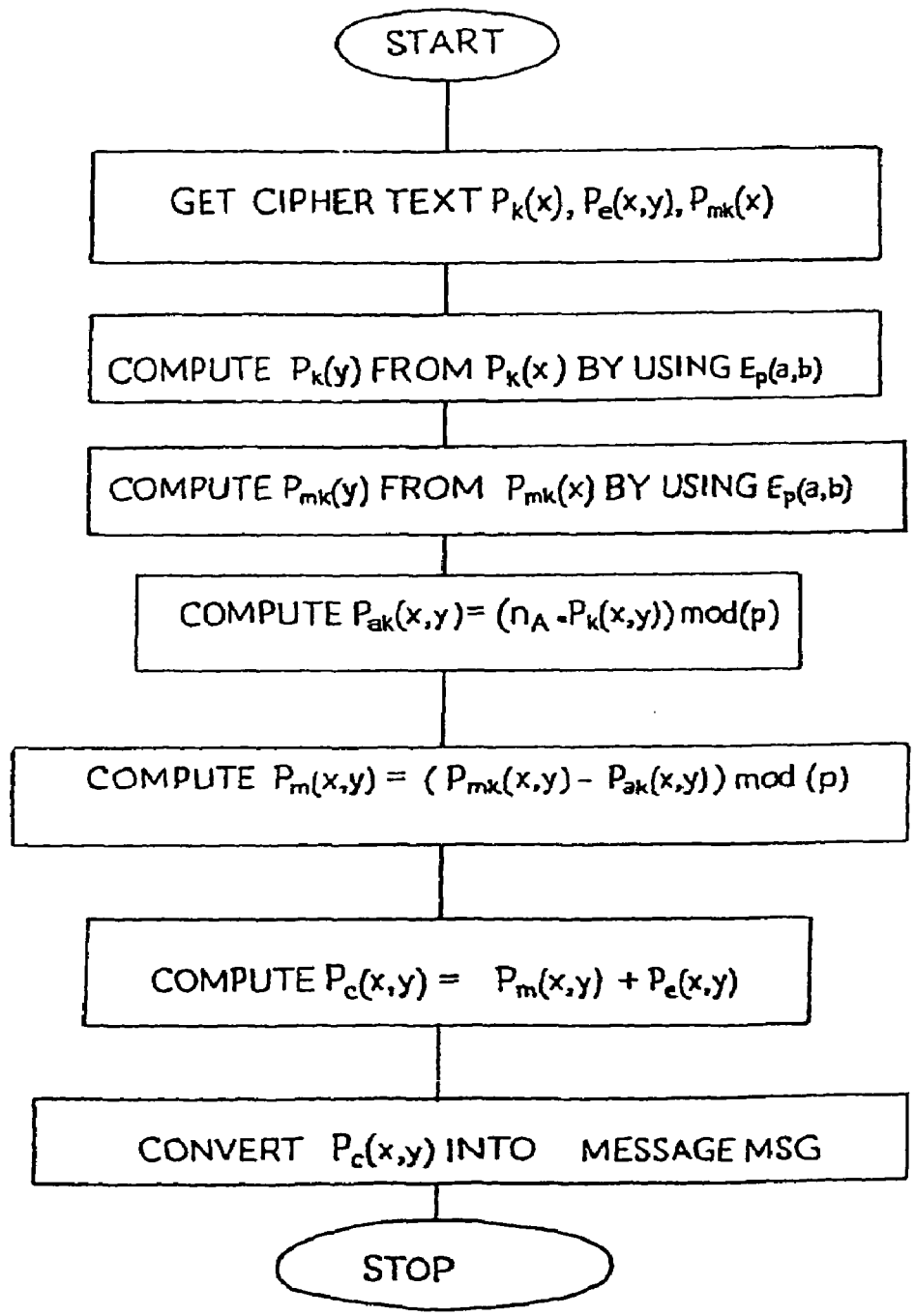
FIG. 7 is a list of steps involved in the decryption of the encrypted message

Referring to FIG. 7, the decryption process reconstructs the message (MSG) from the ciphered message by using the following formula.

$$\begin{aligned}P_c(x,y) &= P_B(x,y)+P_m(x,y)\\ &= P_B(x,y)+(P_{mk}(x,y)-k\cdot P_A(x,y))\\ &= P_b(x,y)+(P_{mk}(x,y)-k\cdot(n_A\cdot G(x,y)))\\ &= P_B(x,y)+(P_{mk}(x,y)-n_A\cdot(k\cdot G(x,y)))\\ &= P_B(x,y)+(P_{mk}(x,y)-n_A\cdot P_k(x,y))\end{aligned}$$

Here, $P_B(x,y)$, $P_{mk}(x,y)$ and $P_k(x,y)$ are obtained from transmitted values and $n_A$ is private key and these values are sufficient to reconstruct the message.

Referring to FIG. 7, The decryption of the ciphered message comprises of following steps:
(i) getting cipher text $(P_k(x), Pe(x,y)$ and $P_{mk}(x))$
(ii) computing $P_k(y)$ from $P_k(x)$ by using elliptic curve $E_p(a,b)$
(iii) computing $P_{mk}(y)$ from $P_{mk}(x)$ by using elliptic curve $E_p(a,b)$
(iv) computing $P_{ak}(x,y)=(n_A\cdot P_k(x,y))$ mod(p)
(v) computing $P_m(x,y)=(P_{mk}(x,y)-P_{ak}(x,y))$ mod(p)
(vi) computing $P_c(x,y)=P_m(x,y)+P_a(x,y)$ (here+stands for addition of coordinates)
(vii) converting $P_c(x,y)$ into the input message MSG It is to be understood that the process of the present invention is susceptible to adaptations, changes and modifications by those skilled in the art. Such adaptations, changes and modifications are intended to be within the scope of the present invention, which is further set forth with the following claims.

We claim:

1. A system for elliptic curve encryption, the system comprising a computer having a computer readable medium having stored thereon instructions which, when executed by a processor of the computer, causes the processor to perform the steps of:
  (a) selecting an elliptic curve $E_p(a,b)$ of the form $y^2=x^3+ax+b$ mod (p), wherein p is a prime number, wherein a and b are non-negative integers less than p satisfying the formula $4a^3+27b^2$ mod (p) not equal to 0;
  (b) generating a 160 bit random number by a method of concatenation of a number of smaller random numbers;
  (c) generating a well hidden point G (x,y) on the elliptic curve $E_p(a,b)$ by scalar multiplication of a point B (x,y) on the elliptic curve with a random integer M further comprising the steps of:
    (i) converting the random integer M into a series of powers of $2^{31}$;
    (ii) converting each coefficient of $2^{31}$ obtained from above step into a binary series;
    (iii) multiplying the binary series obtained from steps (i) and (ii) above with the point B (x,y) on the elliptic curve;
  (d) generating a private key $n_A$ greater than or equal to 160 bits;
  (e) generating a public key $P_A(x,y)$ given by the formula $P_A(x,y)=(n_A\cdot G(x,y))$ mod (p);
  (f) encrypting an input message MSG further comprising the steps of:
    (i) generating a random integer K;
    (ii) setting $P_{mask}(x,y)=k\cdot P_A(x,y)$ mod (p);
    (iii) setting $p_k(x,y)=k\cdot G(x,y)$ mod (p);
    (iv) accepting the input message MSG to be encrypted;
    (v) converting the input message into a point $P_c(x,y)$;
    (vi) generating a random point $P_m(x,y)$ on the elliptic curve $E_p(a,b)$;
    (vii) setting $P_e(x,y)=(P_c(x,y)-P_m(x,y))$;
    (viii) setting $P_{mk}(x,y)=(P_m(x,y)+P_{mask}(x,y))$ mod (p);
    (ix) returning $P_k(x), P_e(x,y)$, and $P_{mk}(x)$ as a ciphered text; and
  (g) decrypting the ciphered text further comprising the steps of:
    (i) getting the ciphered text $(P_k(x), P_{a(x,y)},$ and $P_{mk}(x))$;
    (ii) computing $P_k(y)$ from $P_k(x)$ using the elliptic curve $E_p(a,b)$;
    (iii) computing $P_{mk}(y)$ from $P_{mk}(x)$ using elliptic curve $E_p(a,b)$;
    (iv) computing $P_{ak}(x,y)=(n_A\cdot P_k(x,y))$ mod (p);
    (v) computing $P_m(x,y)=(P_{mk}(x,y)-P_{ak}(x,y))$ mod (p);
    (vi) computing $P_c(x,y)=P_m(x,y)+P_{e(x,y)}$;
    (vii) converting $P_c(x,y)$ into the input message MSG.

2. The system for elliptic curve encryption as claimed in claim 1, wherein the said number p appearing in selection of elliptic curve is a 160 bit length prime number.

3. The system for elliptic curve encryption as claimed in claim 1, wherein the said method of generating the random integer M comprises the steps of:
  (i) setting a variable I equal to 0;
  (ii) setting M to null;
  (iii) determining whether I is less than 6;
  (iv) going to step (vi) if I is less than 6;
  (v) returning M as a result if I is not less than 6;
  (vi) generating a random number RI within (0,1);
  (vii) multiplying RI with $10^9$ to obtain variable BINT, wherein BINT is an integer having 9 digits;
  (viii) concatenating BINT to M;
  (ix) setting I equal to I+1;
  (x) returning to step (iii).

4. The system for elliptic curve encryption as claimed in claim 1, wherein said conversion of the large random integer into a series of powers of $2^{31}$ and conversion of each coefficient $m_n$ of said $2^{31}$ series thus obtained for scalar multiplication for said random integer with the said point B(x,y) on said elliptic curve $E_p(a,b)$ comprises the steps of:

(i) accepting the integer M;
(ii) setting a variable T31 equal to $2^{31}$;
(iii) setting a variable LIM equal to a size of M in bits and initializing an array A( ) with size LIM;
(iv) setting a variable INCRE equal to 0;
(v) setting a variable N equal to M modulus T31;
(vi) setting M equal to INT(M/T31);
(vii) determining whether N is equal to 0;
(viii) going to step (x) if N is equal to 0;
(ix) going to step (xxiv) if N is not equal to 0;
(x) determining whether M is equal to 0;
(xi) going to step (xiii) if M is equal to 0;
(xii) going to step (xxvi) if M is not equal to 0;
(xiii) setting I equal to 0 and J equal to 0;
(xiv) determining whether I is greater than or equal to LIM;
(xv) going to step (xvii) if I is not greater than or equal to LIM;
(xvi) going to step (xxviii) if I is greater than or equal to LIM;
(xvii) determining whether A(I) is equal to 1;
(xviii) going to step (xx) if A(I) is equal to 1;
(xix) returning to step (xxii) if A(I) is not equal to 1;
(xx) setting B (J) equal to I;
(xxi) incrementing J by 1;
(xxii) incrementing I by 1;
(xxiii) returning to step (xiv);
(xxiv) calling a function BSERIES (N,INCRE) and updating array A( );
(xxv) returning to step (x);
(xxvi) setting a variable INCRE equal to INCRE +31;
(xxvii) returning to step (v);
(xxviii) returning array B( ) as a result.

5. The system for elliptic curve encryption as claimed in claim 4, wherein said conversion of the random integer into a series of powers of $2^{31}$ and said conversion of each coefficient $m_n$ of said $2^{31}$ series thus obtained for the said scalar multiplication of the said random integer with the said point B(x,y) on said elliptic curve $E_p$(a,b) further comprises the steps of:
(i) accepting N and INCRE;
(ii) assigning an array BARRAY as an array of values that are powers of $2([2^0, \ldots 2^{30}])$;
(iii) setting a variable SIZE equal to size of N;
(iv) computing a POINTER, wherein the POINTER is equal to 3*(SIZE)+INT(SIZE/3)−4;
(v) determining whether the POINTER is less than 2;
(vi) going to next step (viii) if the POINTER is less than 2;
(vii) going to step (ix) if the POINTER is not less than 2;
(viii) setting the POINTER equal to 0;
(ix) determining whether BARRAY(POINTER) is greater than or equal to N;
(x) going to step (xii) if BARRAY(POINTER) is greater than or equal to N;
(xi) going to step (xx) if BARRAY(POINTER) is not greater than or equal to N;
(xii) determining whether BARRAY (POINTER) is equal to N;
(xiii) going to step (xv) if BARRAY (POINTER) is equal to N;
(xiv) going to step (xvii) if BARRAY (POINTER) is not equal to N;
(xv) setting A (POINTER+INCRE) equal to 1;
(xvi) returning array A( ) as a result;
(xvii) setting A ((POINTER−1)+INCRE) equal to 1;
(xviii) computing N, wherein N is equal to N-BARRAY (POINTER−1);
(xix) returning to step (iii);
(xx) setting the POINTER equal to POINTER+1;
(xxi) returning to step (ix).

6. The system for elliptic curve encryption as claimed in claim 5, wherein said scalar multiplication of the said binary series with the said point B(x,y) on the said elliptic curve $E_p$(a,b) comprises the steps of:
(i) accepting B(x,y), wherein B(x,y) is a point on $E_p$(a,b);
(ii) accepting an array B( ) with size LIM;
(iii) setting another variable I equal to 0 and another variable J equal to 0;
(iv) determining whether B(J) is equal to I;
(v) going to step (vii) if B(J) is equal to I;
(vi) going to step (xxv) if B(J) is not equal to I;
(vii) setting PARR (x,y) (J) equal to B(x,y);
(viii) incrementing J by 1;
(ix) determining whether J is equal to LIM;
(x) going to step (xii) if J is equal to LIM;
(xi) going to step (xxv) if J is not equal to LIM;
(xii) setting K equal to 0;
(xiii) determining whether K is greater than 0;
(xiv) going to step (xvi) if K is greater than 0;
(xv) going to step (xxii) if K is not greater than 0;
(xvi) computing FP(x,y), wherein FP(x,y) is equal to FP(x,y)+PARR(x,y) (K);
(xvii) incrementing K by 1;
(xviii) determining whether K is equal to LIM;
(xix) going to step (xxi) if K is equal to LIM;
(xx) returning to step (xiii) if K is not equal to LIM;
(xxi) returning FP(x,y) as a result;
(xxii) setting FP(x,y) equal to PARR(x,y) (K);
(xxiii) incrementing K by 1;
(xxiv) returning to step (xiii);
(xxv) incrementing I by 1;
(xxvi) setting B(x,y) equal to B(x,y)+B(x,y);
(xxvii) returning to step (iv).

7. The method system for of elliptic curve encryption as claimed in claim 1, wherein said public key $P_A$(x,y) is also a point on said elliptic curve $E_p$(a,b).

8. The system for of elliptic curve encryption as claimed in claim 1, wherein the generation of said private key $n_A$ and said public key $P_A$(x,y) comprises the steps of:
(i) entering a odd integer p greater than or equal to 160 bits;
(ii) determining whether p is a prime number;
(iii) going to step (v) if p is a prime number;
(iv) going to step (xix) if p is not a prime number;
(v) entering an integer a, wherein a is greater than 0;
(vi) setting an integer b equal to 0 and a variable x equal to 1;
(vii) determining whether $4a^3+27b^2$ mod (p) is equal to 0;
(viii) going to step (x) if $4a^3+27b^2$ mod is not equal to 0;
(ix) incrementing b by 1 if $4a^3+27b^2$ mod (p) is equal to 0 and going to step (vii);
(x) setting z equal to $x^3+ax+b$, wherein z is $y^2$;
(xi) determining whether z is a perfect square;
(xii) going to step (xxi) if z is not a perfect square;
(xiii) setting B(x,y) equal to (x,y) if z is a perfect square;
(xiv) selecting a random integer $r_1$;
(xv) setting G(x,y) equal to $(r_1 B(x,y))$ mod (p);
(xvi) selecting a random integer $n_A$;
(xvii) setting $P_A$(x,y) equal to $(n_A \cdot G(x,y))$ mod (p);
(xviii) returning $P_A$(x,y) as a public key and returning $n_A$ as a private key;
(xix) incrementing p by 2;
(xx) returning to step (ii);
(xxi) incrementing x by 1;
(xxii) determining whether x is greater than 900;
(xxiii) going to step (xxv) if x is greater than 900;
(xxiv) going to step (x) if x is not greater than 900;
(xxv) incrementing b by 1;
(xxvi) setting x equal to 1;
(xxvii) returning to step (vii).

* * * * *

UNITED STATES PATENT AND TRADEMARK OFFICE
CERTIFICATE OF CORRECTION

| | | |
|---|---|---|
| PATENT NO. | : 7,680,270 B2 | Page 1 of 1 |
| APPLICATION NO. | : 10/532696 | |
| DATED | : March 16, 2010 | |
| INVENTOR(S) | : Srungaram et al. | |

It is certified that error appears in the above-identified patent and that said Letters Patent is hereby corrected as shown below:

Title page, Item (75) Inventor: Add the second inventor information as follows:

-- Rathindra Nath BISWAS, Kanchanbagh, IN --

Column 10, Lines 17, 21, 22, and 39 of Claim 1, (e)   "$(n_A G(x,y))$" should read -- $(n_A \bullet G(x,y))$ --

(f)   (ii), "$k.P_A(x,y)$" should read -- $k \bullet P_A(x,y)$ --

(f)   (iii), "$k.G(x,y)$" should read -- $k \bullet G(x,y)$ --

(g)   (iv), "$(n_A.P_k x,y)$" should read -- $(n_A \bullet P_k x,y)$ --

Column 10, line 45, Claim 2, "wherein the said" should read -- wherein the --

Column 10, line 63, Claim 4, "the large random integer" should read -- the random integer --

Column 11, line 42, Claim 5, (iv) line 2, "3*(SIZE)" should read -- 3•(SIZE) --

Column 12, line 30, Claim 7, "The method system for of" should read -- The system for --

Column 12, line 33, Claim 8, "The system for of" should read -- The system for --

Column 12, line 54, Claim 8, (xvii), "$(n_A G(x,y))$" should read -- $(n_A \bullet G(x,y))$ --

Signed and Sealed this

Tenth Day of August, 2010

David J. Kappos
*Director of the United States Patent and Trademark Office*